United States Patent [19]
Friedman

[11] Patent Number: 6,130,946
[45] Date of Patent: Oct. 10, 2000

[54] CRYPTOGRAPHS

[75] Inventor: William F. Friedman, Washington, D.C.

[73] Assignee: The United States of America as represented by the National Security Agency, Washington, D.C.

[21] Appl. No.: 02/107,244

[22] Filed: Oct. 23, 1936

[51] Int. Cl.[7] .............................. H04L 9/38; H04L 9/10; H04L 17/02; H04L 17/16

[52] U.S. Cl. ............................ 380/26; 380/287; 380/52; 380/56; 380/57; 380/59; 341/50; 341/90; 341/91

[58] Field of Search ..................................... 380/255, 259, 380/270, 287, 26, 51, 52, 55, 56, 57, 58, 59; 341/50, 90, 91

[56] References Cited

U.S. PATENT DOCUMENTS

| | | | |
|---|---|---|---|
| 1,540,107 | 6/1925 | Damm | 380/52 |
| 1,644,239 | 10/1927 | Damm | 380/58 |
| 1,683,072 | 9/1928 | Hebern | 380/52 |
| 2,028,772 | 1/1936 | Friedman | 380/26 |

*Primary Examiner*—Bernarr Earl Gregory
*Attorney, Agent, or Firm*—Robert Laughlin; Charles Rowe

[57] ABSTRACT

The cryptographic system automatically and continuously changes the cipher equivalents representing plaintext characters so as to prevent any periodicity in the relationship. The system has a series of juxtaposed, rotatable, connection changing mechanisms to provide a large number of alternative paths for the passage of an electric current corresponding to a message character. Further, the system has parts for the irregular and permutative displacements of the members of a set of circuit changing mechanisms to thwart cryptanalysis. The juxtaposed cipher commutators are controlled by cam wheels of different diameters.

5 Claims, 3 Drawing Sheets

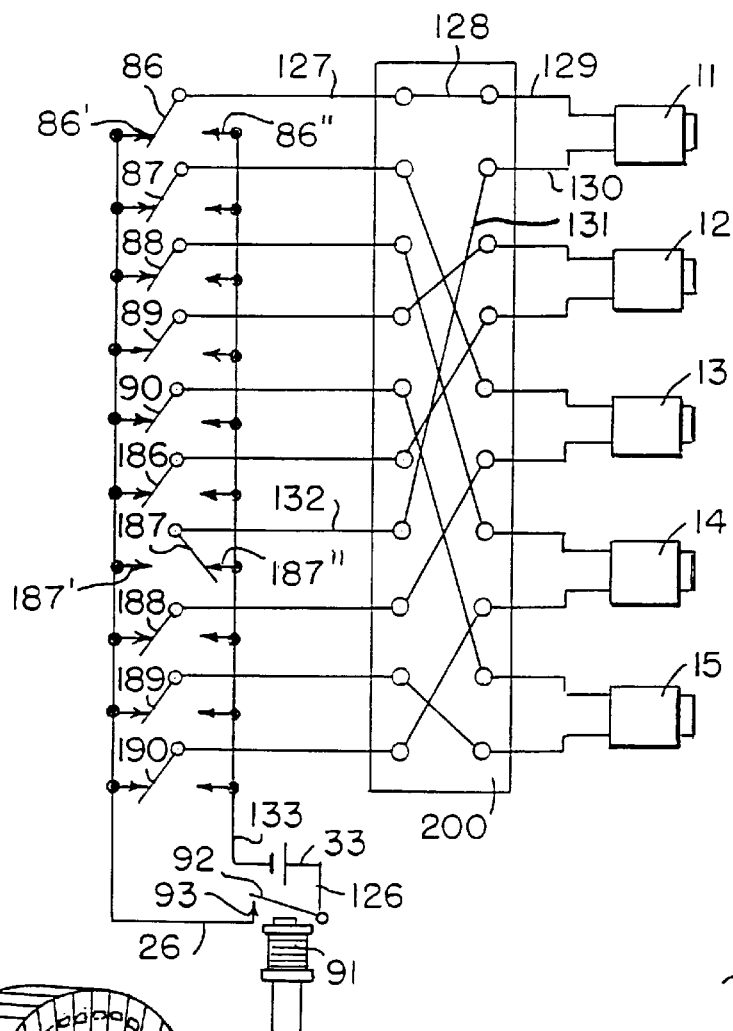
FIG. 2
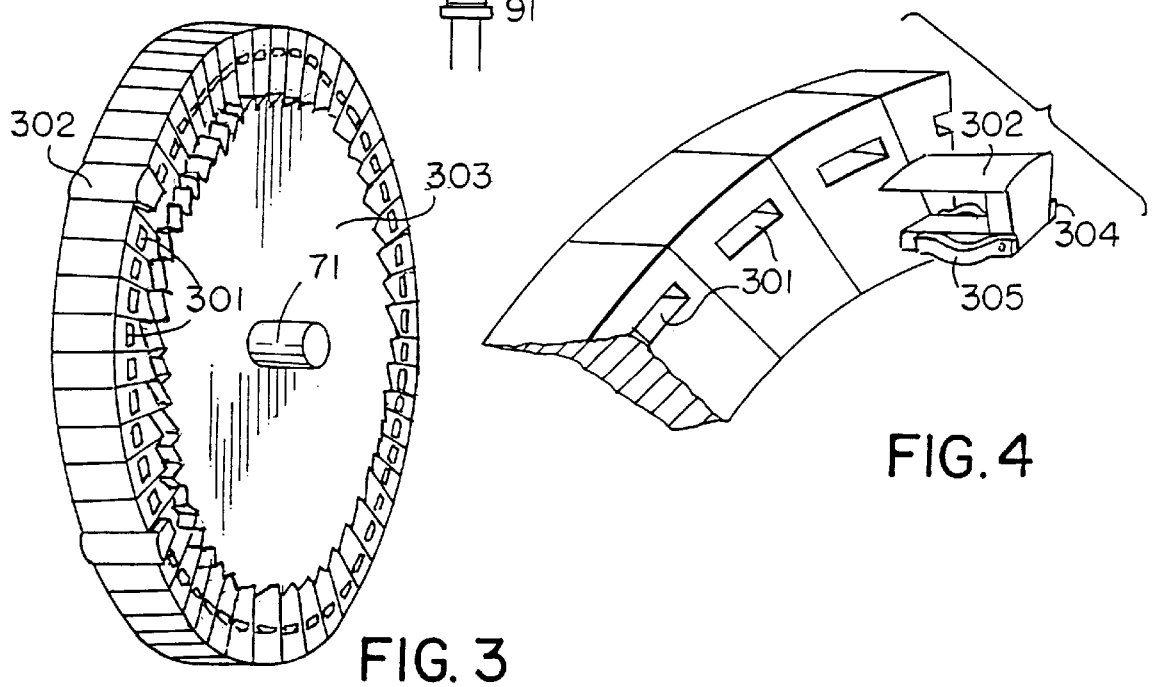
FIG. 3
FIG. 4

CRYPTOGRAPHS

CROSS-REFERENCE TO RELATED APPLICATION

This invention relates to cryptographs and is an improvement based upon the subject-matter of my prior application Ser. No. 02/682,096, filed Jul. 25, 1933.

In said application Ser. No. 02/682,096, I disclose a cryptographic system and mechanism, the basic feature of which is the provision of means for aperiodically controlling a set of juxtaposed cipher commutators giving cryptographically a cascade effect. In that system the means referred to involves the use of a cipher-key transmitter through which a perforated key-tape is passed.

The object of this invention is to control the juxtaposed cipher commutators by means of an associated set of cam wheels of different diameters, thus dispensing with the perforated tape referred to above.

BRIEF DESCRIPTION OF THE DRAWINGS

The invention is illustrated in the accompanying drawings, in which:

FIG. 2 shows paired circuits corresponding to a set of ten cam wheels for electrically controlling the five electro-magnetic stepping devices of FIG. 1, together with switching means for interchanging the electrical conditions set up by the cam wheels;

FIG. 3 shows a detail of one of the cam wheels; and

FIG. 4 is another detail showing a replaceable cam element and the mode of assembly thereof with the wheel.

DETAILED DESCRIPTION OF THE INVENTION

Figure 1:
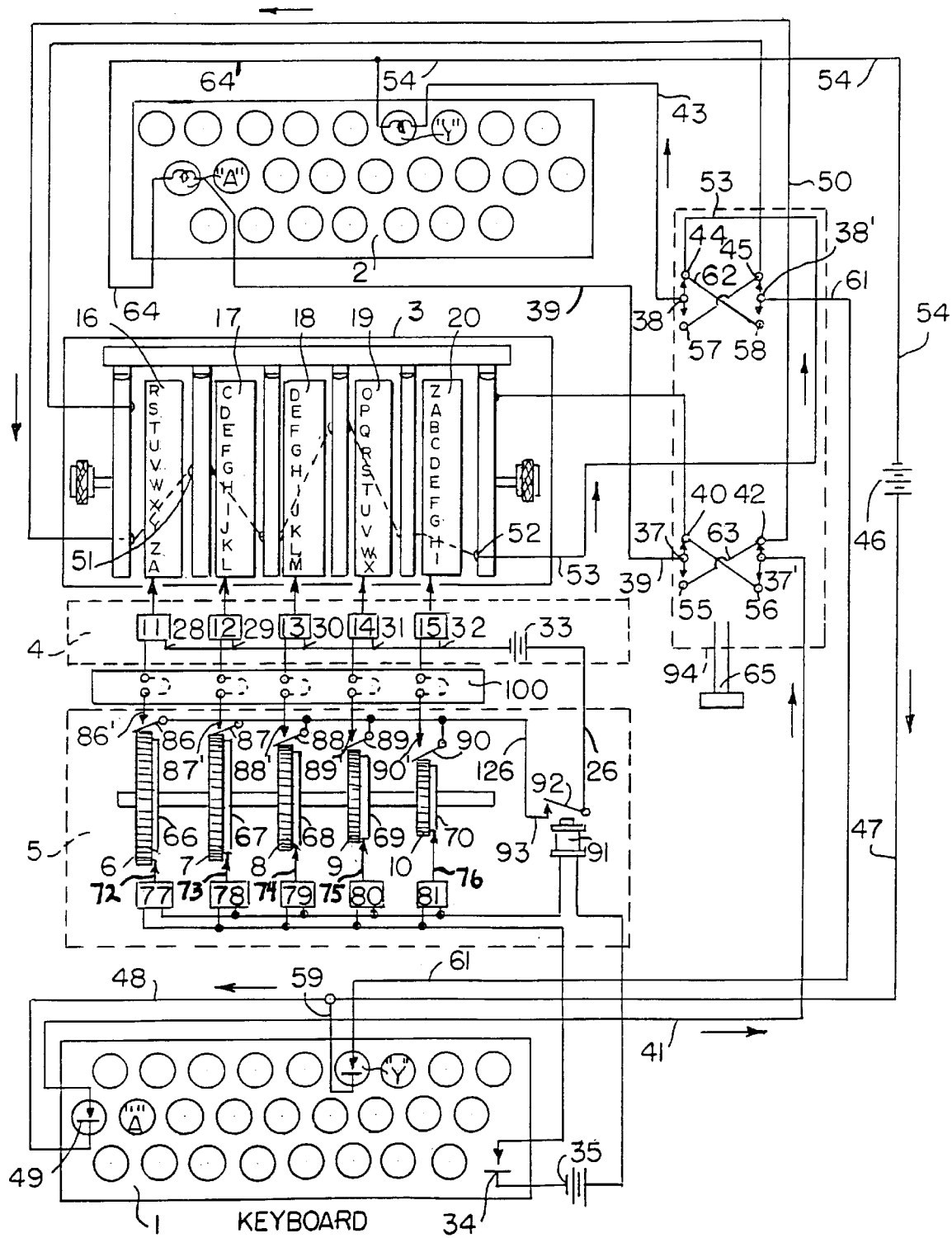
FIG. 1 is a schematic diagram of the mechanism, including a set of five cam wheels controlling a corresponding number of electro-magnetic stepping devices for effecting angular displacement of the commutators.

Referring to FIG. 1, there are shown the following elements which are well-known in the art applicable to modern cryptographs employing rotatable cipher commutators: the numeral 1 generally designates a standard typewriter keyboard provided with a set of keys for closing a set of contacts corresponding to character elements; the numeral 2 generally designates a bank of recording or indicating devices which may take the form of a set of magnets of a printing mechanism, or a set of glow lamps to indicate by illumination of superimposed lettering the character equivalents resulting from operation of the keyboard; the numeral 3 generally designates a set of juxtaposed, rotatable circuit changers constructed in the form of switching commutators commonly called cipher commutators or cryptographic rotors, mountable upon a common shaft and arranged to rotate relative to one another and to fixed end plates, in order to provide a large number of variable paths for the passage of an electric current representing a message character set up on the keyboard, the exact path traversed in each instance being determined by the relative rotatory positions of the whole set of cipher commutators and end plates at that instant; the number 4 generally designates a set of stepping mechanisms for effecting angular displacements of the cipher commutators. The essence of the present invention consists in the provision of means, indicated generally at 5, for controlling these stepping mechanisms through the intermediacy of a set of pawls and ratchets, and cam wheels associated with the ratchets, the cams opening and closing circuits for operating the electro-magnetically controlled stepping mechanisms.

Figure 1A:
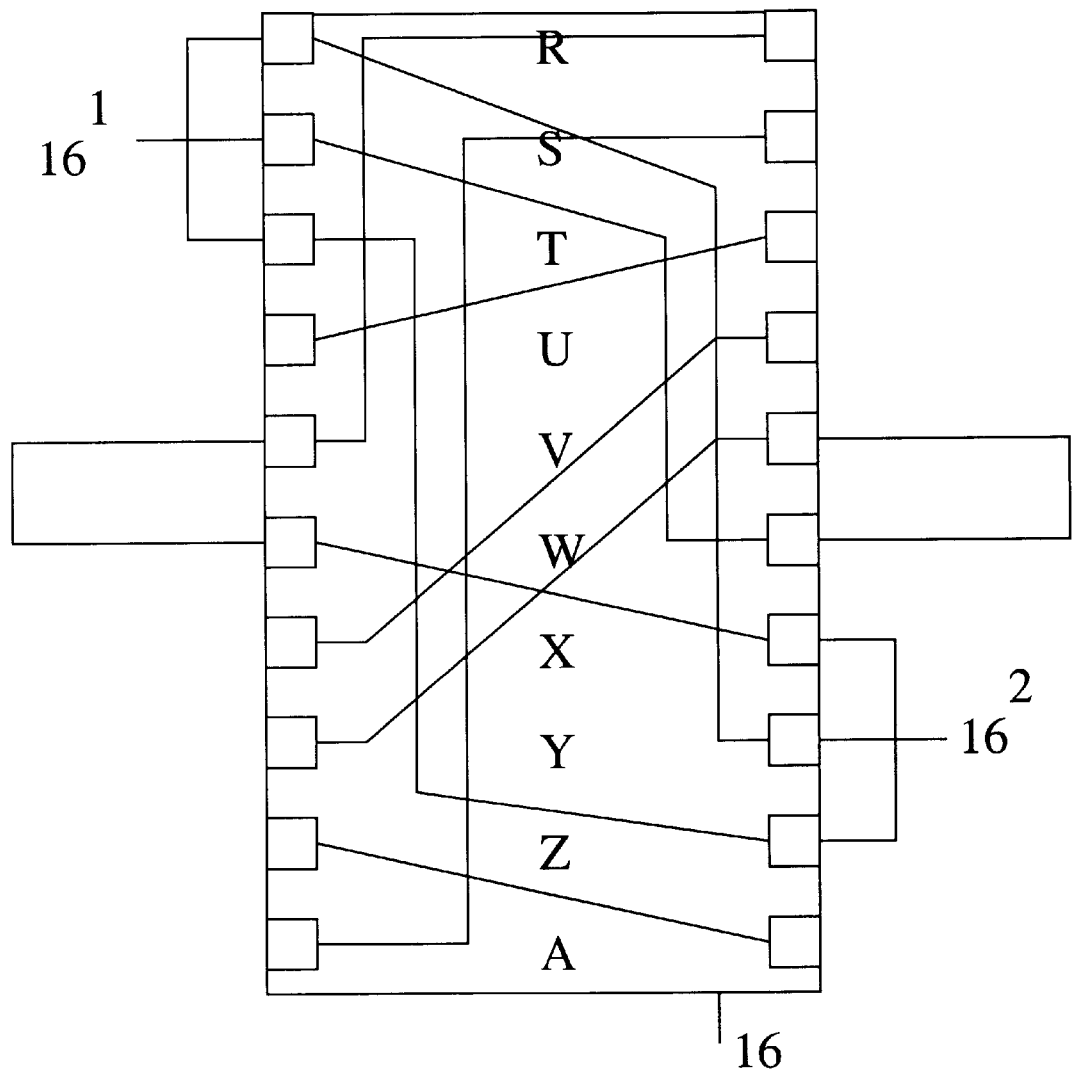
FIG. 1a is a diagrammatic illustration of the structure of the commutators of FIG. 1.

The structure of a commutator (16, for example) is illustrated in diagram in FIG. 1a. It consists of a hollow disc formed of bakelite or other insulating material, and bears on one face thereof contacts 16' and on the other face thereof contacts $16^2$ of electrically conductive material. While it does not appear from the showing of FIG. 1a, there are usually twenty-fix contacts on the obverse of the disc, and twenty-six, on the reverse thereof, and on each face the contacts are arranged in an annulas symmetrical with the disc. One set of contacts, as 16', may be considered the input contacts, and the other set $16^2$, the output contacts, although ordinarily such commutators are reversible so that contacts $16^2$ might, in a subsequent cryptographic operation, serve as input contacts and contacts 16', as output contacts. The exact nature of the contacts if of no significance so far as this invention is concerned; suffice it to say that whereas use is sometimes made of springs, it is also commonplace to use flush contacts, and it is this type which is illustrated. The contacts of the two groups are connected in pairs at random or according to some complex rule by means of wires as $16^3$. Thus, in the illustration, input contact A is connected to output contacts S, X to U, etc. This general type of cryptographic rotor may be found further illustrated and described in the prior art (see, for example, the patent to Hebern U.S. Pat. No. 1,861,857, and especially FIGS. 8 and 9).

The most important elements of the cipher commutator control assembly 5 are as follows: a set of five cam wheels 6, 7, 8, 9, and 10, are mounted upon a common shaft 71 upon which they are individually free to rotate. Rigidly fixed to each cam wheel are the respective ratchets 66, 67, 68, 69, and 70, driven by pawls 72, 73, 74, 75, and 76 under the action of magnets 77, 78, 79, 80, and 81. These magnets are actuated by a set of circuits having a common conductor 134, in which is inserted universal keyboard contact 34. Each ratchet has a different number of teeth, the numbers preferably being prime to one another. For example, let ratchets 66, 67, 68, 69, and 70 have 51, 50, 49, 47, and 43 teeth, respectively. The cam wheels associated with the various ratchets are of varying diameters and have their peripheries divided up into numbers of segments corresponding with the numbers of teeth on the ratchet to which each cam wheel is attached; so that, for example, cam wheel 6 has its periphery divided up into 51 equal segments, cam wheel 7 has its periphery divided up into 50 equal segments, and so on. The segments on the various cam wheels are made of equal angular length and, for keying purposes, they are numbered so that the set of cam wheels can be aligned to a bench mark according to a prearranged key. The segments of each cam wheel are slotted as at 301, and into these slots are inserted small slidable plates. These plates are formed with curved or arcuate upper surfaces, so that when inserted in the slots these curved surfaces project above the rim of the wheel and function as cams. It will be understood that the other segments have their surfaces coincident or flush with the perimeter or outer rim surface of the cam wheel. The distribution of the said cam plates which are to be inserted in each cam wheel in relation to the other segmental surfaces constitutes one of the elements of the cipher key to the system. These plates together with the remaining segmental elements of the wheels control contact levers 86, 87, 88, 89, and 90 and their respective contacts 86', 87', 88', 89' and 90'; that is, when a plate with a cam surface is presented to contact lever 86, for example, the cam action serves to close contact 86', otherwise that contact remains open. Contact levers 86, 87, 88, 89, and 90 control stepping magnets 11, 12, 13, 14, and 15, which operate the stepping mechanisms of the cipher commutators, in a manner presently to be explained.

With the arrangement of cam wheels shown in FIG. 1, the cryptographic period of the assembly of cipher commutators is equal to the product of the numbers of teeth in the set of ratchets 66, 67, 68, 69, and 70. In this case, with the numbers of teeth being 51, 50, 49, 47, and 43 respectively, the period is 252,523,950.

The manner in which the system as a whole functions will now be described. The first step, of course, is to set the cryptograph to the predetermined key. This comprises the following elements: the horizontal permutation or arrangement of cipher commutators on the shaft; the rotatory alignment of the commutators, according to a group of letters aligned on a bench mark; the exact distribution of the slidable plates and their relation to the other segmental elements of the cam wheels; the rotatory alignment of the cam wheels according to a group of characters aligned on a bench mark; finally, the cryptograph is set to the enciphering position. When the key corresponding to "A" is depressed on the keyboard a current flows from battery 46, along conductors 47, 48, to closed contact 49, conductor 41, contacts 37', 42, conductor 50, contact 51, input contact Y to output contact V of rotor 16, straight through stator $16_1$, input contact G to output contact J of rotor 17, straight through stator $17_1$, input contact K to output contact F of rotor 18, straight through stator $18_1$, input contact B to output contact V of rotor 19, straight through stator $19_1$, input contact G to output contact H of rotor 20, emerging at contact 52 on the right end plate, conductor 53, contacts 44, 38, conductor 43, to lamp or indicating device "Y", conductor 54 back to battery 46. It will be understood that contact 51 is merely an example of a circular array of twenty-six fixed input contacts mounted in the left end plate of the machine, these contacts being arranged to cooperate electrically with the input contacts 16' of rotor 16, and contact 52 is one of a similar array of fixed output contacts arranged in the right end of plate of the device. Upon release of key "A", and at the end of the return excursion or back stroke of a universal bar on the keyboard, universal contact 34 is closed and a circuit is passed through the set of magnets 77, 78, 79, 80, and 81, causing the pawls 72, 72, 74, 75, and 76 to set so that cam wheels 6, 7, 8, 9, and 10 are advanced one step. A single magnet can of course be used for this purpose, with mechanical means for affecting each pawl. The universal keyboard contact circuit includes relay 91 which controls contact lever 92 and contact 93, which is in the circuit controlling magnets 11, 12, 13, 14, and 15, so that current can pass through the latter magnets only at the instant when the universal contact is closed. When the cam wheels 6, 7, 8, 9, and 10 are advanced one step, a new combination of operative and inoperative contact levers 86 to 90 and of open and closed contacts 86', 87', 88', 89', and 90' is set up, and corresponding thereto magnets 11, 12, 13, 14, and 15 are actuated. These control the displacement mechanisms associated with the cipher commutators and set up a new path through the commutators for the encipherment of the next letter.

To decipher the message, screw 65 is revolved to set the switch plate 94 to the deciphering position. The cipher commutators and the cam wheels must of course also be returned to the initial positions and arrangements employed in enciphering. Assuming this, and assuming that the letter earlier enciphered is now to be deciphered, key "Y" is depressed to close the switch controlled thereby, whereupon current will flow from battery 46 through conductors 47, 59, 61, movable contact 38', fixed contact 58, fixed contact 44, line 53, and contact 52 on the right end stator of the rotor maze. Thence it will follow the course exactly like that above described except in the opposite direction, namely, output contact H (now functioning as an input contact) to input contact G of rotor 20, straight through stator $19_1$, output contact V to input contact Q of rotor 19, straight through stator $18_1$, output contact F to input contact K of rotor 18, straight through stator $17_1$, output contact J to input contact G of rotor 17, straight through stator contact $16_1$, output contact V to input contact Y of rotor 16, and thence to contact 51, line 50, fixed contacts 42 and 55, movable contact 37, line 39, indicator "A" of bank 2, line 64, line 54, and back to battery 46. As in the enciphering step, the release of key "Y" closes universal contact 34, and a circuit is completed through magnets 77–81 to cause cam wheels 6–10 to advance one step.

It would be easy to provide means, consisting of a simple switchboard 100 with a plug and jack arrangement for connecting contacts 86' to 90' to magnets 11 to 15 in any one of 120 different permutations.

In FIG. 1 I have shown an assembly of but five cam wheels, one for each cipher commutator. But it is readily possible to have a set of ten cam wheels which can be electrically combined into five pairs to control the five cipher commutators. This is shown schematically in FIG. 2, in which 11, 12, 13, 14, and 15 are the similarly numbered magnets of FIG. 1, for controlling the stepping mechanisms of the cipher commutators. Contact lever 86 is the same as the similarly numbered contact lever of FIG. 1, except that this lever is now associated with two contacts, a lower contact 86', against which it normally rests, and an upper contact 86" which it touches when a button on the cam wheel is presented to the contact lever 86. Contact levers 87, 88, 89, and 90 are of the same form as contact lever 86, and serve similar functions; they are homologous to similarly numbered levers of FIG. 1 and, like contact lever 86 of FIG. 2, they are each associated with paired contacts. Contact levers 186, 187, 188, 189, and 190 are five additional contact levers similar to 86, 87, 88, 89, and 90; they are associated with and operated by five additional cam wheels, so that there are now ten cam wheels and ten contact levers. If the numbers of segments on cam wheels 6, 7, 8, 9, and 10 of FIG. 1, are as indicated before, namely, 51, 50, 49, 47, and 43, the numbers of segments on the additional five cam wheels may, for example, be 41, 37, 31, 29, and 23. The complete period of the whole system of cam wheels in this case would be 51×50×49×47×43×41×37×31×29×23.

In FIG. 2, the switchboard 200 serves as a means for interconnecting the contact levers 86, 87, 88, 89, 90, 186, 187, 188, 189, and 190 in pairs, and by a multitude of different arrangements, so that the five sets of paired contact levers control the five magnets 11, 12, 13, 14, and 15 by a paired relationship explained below. For example, as interconnected in FIG. 2, magnet 11 is controlled jointly by contact levers 86 and 187; magnet 12 is controlled jointly by contact levers 188 and 189; magnet 13, by 90 and 186; magnet 14, by 88 and 190; magnet 15, by 87 and 89. The relay 91 in FIG. 2 is the same as the similarly numbered relay in FIG. 1 and serves the same function, namely, to apply potential to the circuits controlled by contact levers 86, 87, 88, 89, 90, 186, 187, 188, 189, 190 only on the back stroke of the universal bar on the keyboard.

The manner in which a magnet 11 of FIG. 2, for example, is controlled by its temporarily associated contact levers, in this case 86 and 187, is as follows: Suppose contact lever 86 is at its lower position, against contact 86', there being at that moment on the periphery of the first cam wheel a segment which is flush with the rim of the wheel, that is, no cam surface is presented to contact lever 86; that at the same moment contact lever 187 is at its upper position, against its upper contact 187', there being at that moment on the periphery of the seventh cam wheel a plate which bears a projecting cam surface. A circuit is established thus: battery 33, conductor 126, contact leer 92 of relay 91, which is at that moment energized from the keyboard as explained above, contact 93, conductor 26, contact 86', contact lever 86, conductor 127, flexible conductor 128 of switchboard 200, conductor 129, through magnet 11, conductor 130, flexible conductor 131 of switchboard 200, conductor 132, contact 187" against which contact lever 187 is now resting, conductor 133, back to battery 33. Magnet 11 is energized. It will be seen that magnet 11 is subject to four conditions:

(1) Contact lever 86 is making contact at 86' when contact lever 187 is making contact at 187'. No circuit will be established through magnet 11, because both levers are then connected to the same side of the battery 33.

(2) Contact lever 86 is making contact at 86' when contact lever 187 is making contact at 187". A circuit will be established through magnet 11.

(3) Contact lever 86 is making contact at 86' when contact lever 187 is making contact at 187'. A circuit will be established through magnet 11.

(4) Contact lever 86 is making contact at 86" when contact lever 187 is making contact at 187". No circuit is established through magnet 11.

The same set of four conditions applies to magnets 12, 13, 14, and 15 and their associated contact levers and contacts.

By interchanging the connections established at switchboard 200 great variability in electrical effects of the set of contact levers is afforded for cryptographic keying purposes.

In FIG. 3 is shown a detail of one of the cam wheels, with its slots 301, removable plates 302, and ratchet 303. The removable plates 302 are provided with springs 304, 305 to hold the plate in place when inserted in the slot.

Changes, modifications and equivalent arrangements are contemplated within the scope of the invention as defined by the appended claims:

I claim:

1. In a cryptograph, a keyboard comprising character elements and corresponding signaling elements for electrical connection therewith; means comprising a lead for each said character element said leads terminating in an array of fixed contacts and a set of more then two juxtaposed, rotatable commutators for varying the connections between said fixed contacts and said signaling elements; a plurality of cam-bearing members; means for effecting stepwise angular displacements of said cam-bearing members with individual key operation of said keyboard; a series of commutator stepping mechanisms each comprising an electro-magnet and an associated ratchet and pawl, each ratchet and pawl, actuating its associated commutator, the set of commutator stepping mechanisms being controlled by the said cam-bearing members associated as a group and coordinated collectively to effect permutative, substantially aperiodic stepwise displacements of the commutators.

2. A mechanism of the character described in claim 1 in which the periphery of each cam-bearing member is divided up into equal-spaced segments, the numbers of segments on the respective cam-bearing members being prime to one another.

3. In a cryptograph of the character described, the combination of keyboard elements and signaling elements; means for electrically interrelating the same in pairs including a lead for each keyboard element said leads terminating in an array of fixed contacts and a set of more than two juxtaposed rotatable commutators for varying the relationships between the two sets of elements; a set of commutator stepping mechanisms for displacing the respective commutators in a stepwise manner; and a plurality of rotatable cam-bearing members for collectively controlling the commutator stepping mechanisms to effect the stepwise displacements of the commutators in a permutative and substantially aperiodic manner.

4. In combination a set of character elements constituting a keyboard; a switch individual to each element and operable thereby and a lead connected thereto and energizable thereby upon operation thereof each said lead terminating in a fixed contact; a corresponding number of translating devices operable by said elements; a wiring system interposed between said fixed contacts and said translating devices rendering available a multiplicity of electrical paths between said switches and said devices; and means acting in response to each key operation for selecting in substantially aperiodic succession groups of said paths, said last named means comprising a set of contact levers and associated contacts, and a plurality of rotatable cam-bearing members displaceable at different angular velocities in response to each key operation for controlling said levers and contacts, the numbers of cam positions on the respective cam-bearing members being prime to one another.

5. In combination a set of character elements constituting a keyboard; a switch individual to each element and operable thereby and a lead connected thereto and energizable thereby upon operation thereof each said lead terminating in a fixed contact; a corresponding number of translating devices operable by said elements; a wiring system interposed between said switches and said translating devices rendering available a multiplicity of electrical paths between said fixed contacts and said devices whereby each switch may become associated with any one of said translating devices, said system comprising more than two adjustably movable connectors whereby the wiring system may be given an initial setting providing one electrical path for each switch; and means operable in response to each key operation for changing such setting in substantially aperiodic progression, said last-named means comprising a set of cam-bearing members displaceable at different angular rates in response to individual key operation, a set of contact levers and associated contacts operated by said cam-bearing members, said contact levers and contacts controlling the association of each said switch with any one of said plurality of translating devices.

\* \* \* \* \*